United States Patent
Thubert et al.

(10) Patent No.: US 9,900,169 B2
(45) Date of Patent: Feb. 20, 2018

(54) RELIABLE MULTICAST IN LOW-POWER AND LOSSY NETWORKS

(71) Applicant: Cisco Technology, Inc., San Jose, CA (US)

(72) Inventors: Pascal Thubert, La Colle sur Loup (FR); Ijsbrand Wijnands, Leuven (BE); Gregory Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 14/661,301

(22) Filed: Mar. 18, 2015

(65) Prior Publication Data

US 2016/0277201 A1 Sep. 22, 2016

(51) Int. Cl.
| | |
|---|---|
| *H04L 1/16* | (2006.01) |
| *H04L 12/18* | (2006.01) |
| *H04L 1/18* | (2006.01) |
| *H04W 52/02* | (2009.01) |
| *H04W 72/00* | (2009.01) |

(Continued)

(52) U.S. Cl.
CPC ........ *H04L 12/1881* (2013.01); *H04L 1/1614* (2013.01); *H04L 1/188* (2013.01); *H04W 52/0219* (2013.01); *H04W 72/005* (2013.01); *H04L 2001/0093* (2013.01); *H04W 84/18* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2005/0220145 A1* | 10/2005 | Nishibayashi | ........ | H04W 99/00 370/474 |
| 2006/0018332 A1* | 1/2006 | Kakani | ................. | H04L 1/1614 370/428 |

(Continued)

FOREIGN PATENT DOCUMENTS

WO    WO-2007/133048 A1    11/2007

OTHER PUBLICATIONS

Jung Peng: "A New ARQ Scheme for Reliable Broadcasting in Wireless LANs", IEEE Communications Letters, IEEE Service Center, Piscataway, NJ, US, vol. 12, No. 2, Feb. 1, 2008.
Holland O et al.: "Constrained Multicast Retransmission Forwarding Under Bitmapped Feedback Packets", Electronics Letters, IEE Stvenage, GB, vol. 42, No. 7, Mar. 30, 2006.

(Continued)

*Primary Examiner* — Gregory Sefcheck
*Assistant Examiner* — Jenkey Van
(74) *Attorney, Agent, or Firm* — Parker Ibrahim & Berg LLC; James M. Behmke; Stephen D. LeBarron

(57) ABSTRACT

In one embodiment, a device in a network sends a first multicast message to a plurality of destinations in the network. The first multicast message includes a first bitmap that identifies the destinations. The device receives one or more acknowledgements from a subset of the destinations. The device determines a retransmission bitmap that identifies those of the plurality of destinations that did not acknowledge the first multicast message, based on the received one or more acknowledgements. The device sends a retransmission multicast message to those of the plurality of destinations that did not acknowledge the first multicast message. The retransmission multicast message includes the retransmission bitmap.

14 Claims, 14 Drawing Sheets

(51) Int. Cl.
*H04L 1/00* (2006.01)
*H04W 84/18* (2009.01)

(56) References Cited

U.S. PATENT DOCUMENTS

| | | | | |
|---|---|---|---|---|
| 2009/0245252 | A1* | 10/2009 | Konishi | H04L 1/1809 |
| | | | | 370/390 |
| 2011/0096710 | A1* | 4/2011 | Liu | H04L 1/1614 |
| | | | | 370/312 |
| 2011/0238793 | A1* | 9/2011 | Bedare | H04L 45/586 |
| | | | | 709/220 |
| 2012/0113986 | A1* | 5/2012 | Shaffer | H04L 1/1854 |
| | | | | 370/390 |
| 2012/0117438 | A1 | 5/2012 | Shaffer et al. | |
| 2012/0207087 | A1* | 8/2012 | Wentink | H04L 1/1621 |
| | | | | 370/328 |
| 2014/0119204 | A1* | 5/2014 | Guo | H04L 49/9078 |
| | | | | 370/252 |

OTHER PUBLICATIONS

International Search Report dated May 17, 2016 in connection with PCT/US2016/020818.
Reliable Multicast; http://en.wikipedia.org/wiki/Reliable_multicast; pp. 1-3.
Ijsbrand Wijnands, "Routing Over Low power and Lossy networks (roll) ietf wg mailing list", Nov. 4, 2014, pp. 1-4.
Header Encoding Design Considerations, pp. 147-148.
Wijnands et al., "Multicast using Bit Index Explicit Replication draft-wijnands-bier-architecture-04", Internet Engineering Task Force, http://tools.ietf.org/html/draft-wijnands-bier-architecture-04, Feb. 2, 2015, pp. 1-30.
Bergmann et al., "Constrained-Cast: Source-Routed Multicast for RPL draft-bergmann-bier-ccast-00", Network Working Group, Nov. 9, 2014, pp. 1-6.
Wijnands et al., "Encapsulation for Bit Index Explicit Replication in MPLS Networks draft-wijnands-mpls-bier-encapsulation-02", Internet Engineering Task Force, Dec. 4, 2014, pp. 1-13.

* cited by examiner

RELIABLE MULTICAST IN LOW-POWER AND LOSSY NETWORKS

TECHNICAL FIELD

The present disclosure relates generally to computer networks, and, more particularly, to using performing reliable multicasting in Low-Power and Lossy Networks (LLNs).

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
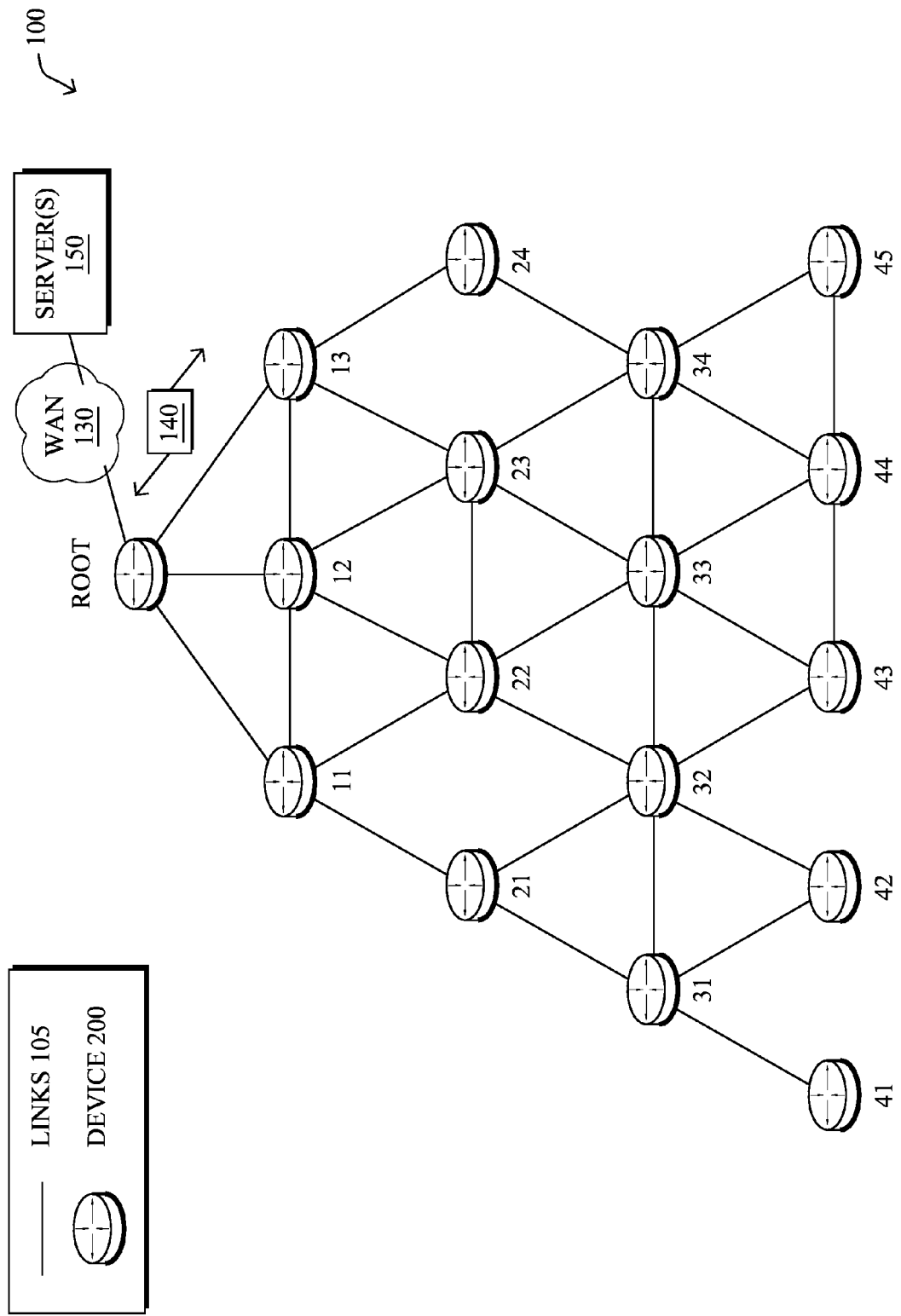
FIG. 1 illustrates an example communication network.

According to one or more embodiments of the disclosure, a device in a network sends a first multicast message to a plurality of destinations in the network. The first multicast message includes a first bitmap that identifies the destinations. The device receives one or more acknowledgements from a subset of the destinations. The device determines a retransmission bitmap that identifies those of the plurality of destinations that did not acknowledge the first multicast message, based on the received one or more acknowledgements. The device sends a retransmission multicast message to those of the plurality of destinations that did not acknowledge the first multicast message. The retransmission multicast message includes the retransmission bitmap.

In further embodiments, a node in a network forwards a first multicast message to a plurality of destinations based on a first bitmap included in the first multicast message. The first bitmap identifies the plurality of destinations. The node receives acknowledgements from two or more of the plurality of destinations. A particular received acknowledgement includes an acknowledgement bitmap that identifies one of the plurality of destinations that acknowledged receipt of the multicast message. The node aggregates the received acknowledgements by aggregating acknowledgement bitmaps into an aggregated bitmap. The aggregated bitmap identifies those of the plurality of destinations that acknowledged receipt of the first multicast message. The node provides an aggregated acknowledgement that includes the aggregated bitmap to a source of the multicast message.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "Root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
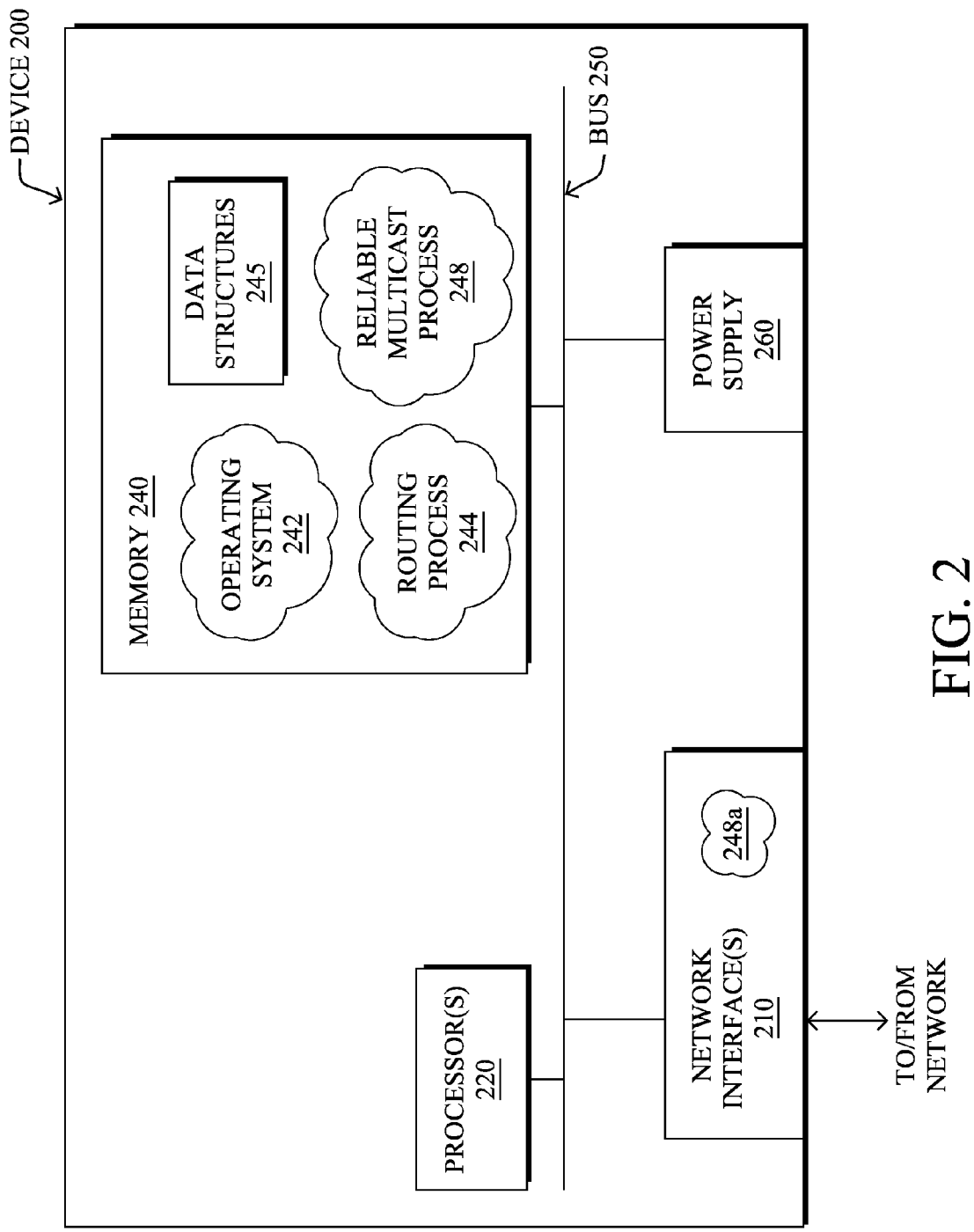
FIG. 2 illustrates an example network device/node.

FIG. 2 is a schematic block diagram of an example node/device 200 that may be used with one or more embodiments described herein, e.g., as any of the nodes shown in FIG. 1 above or otherwise described herein. The device may comprise one or more network interfaces 210 (e.g., wired, wireless, PLC, etc.), at least one processor 220, and a memory 240 interconnected by a system bus 250, and powered by a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a reliable multicast process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Rat (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
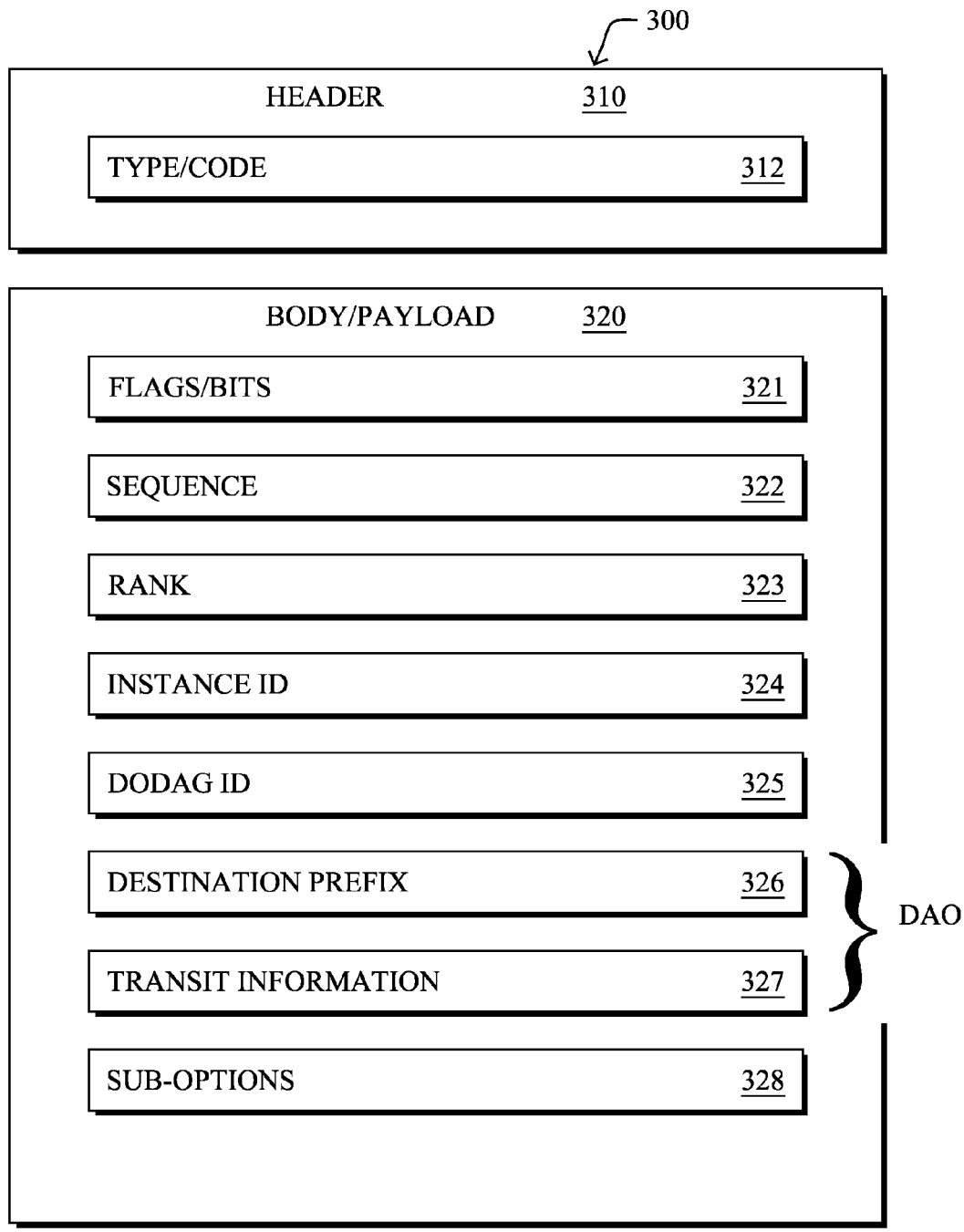
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
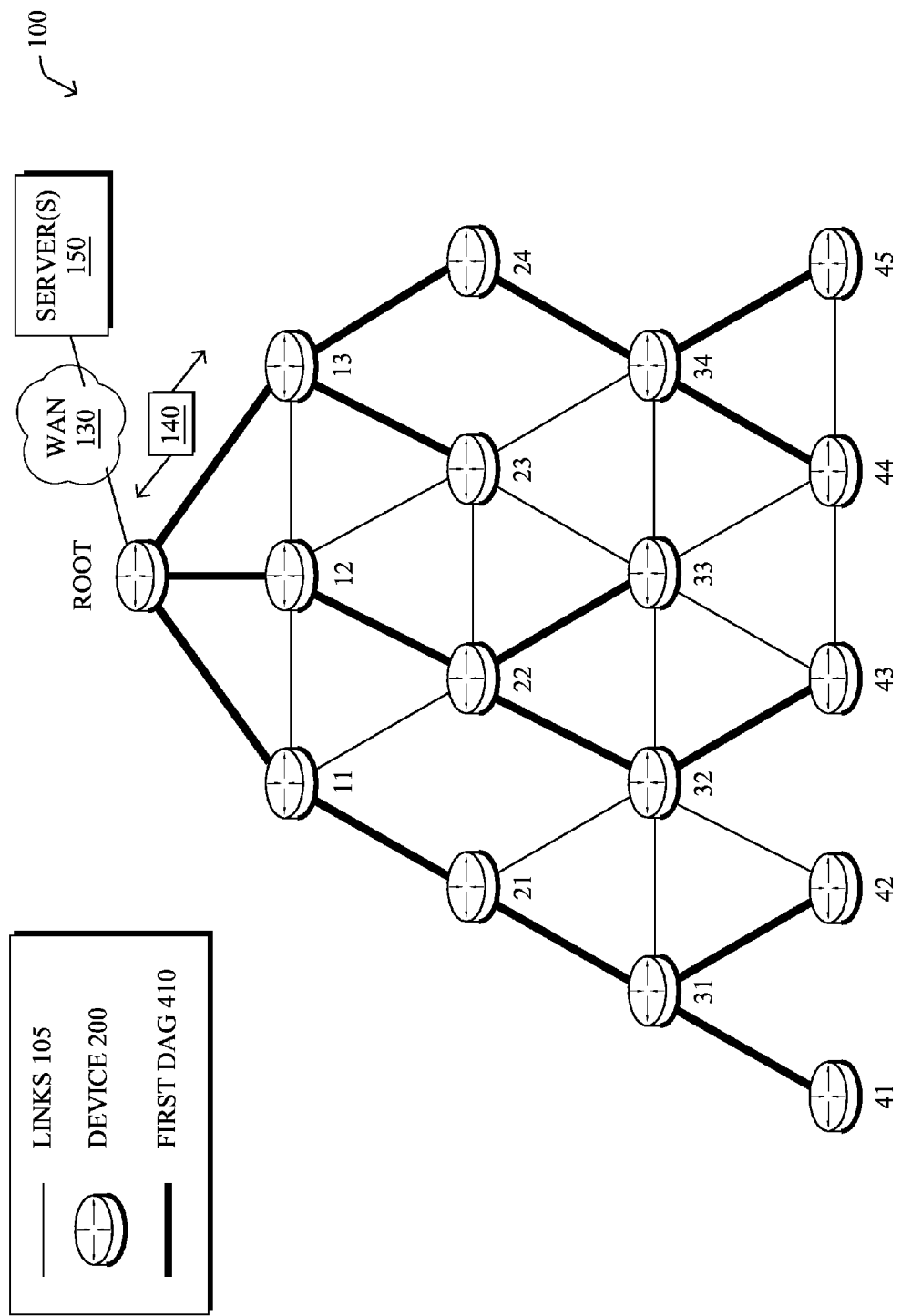
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
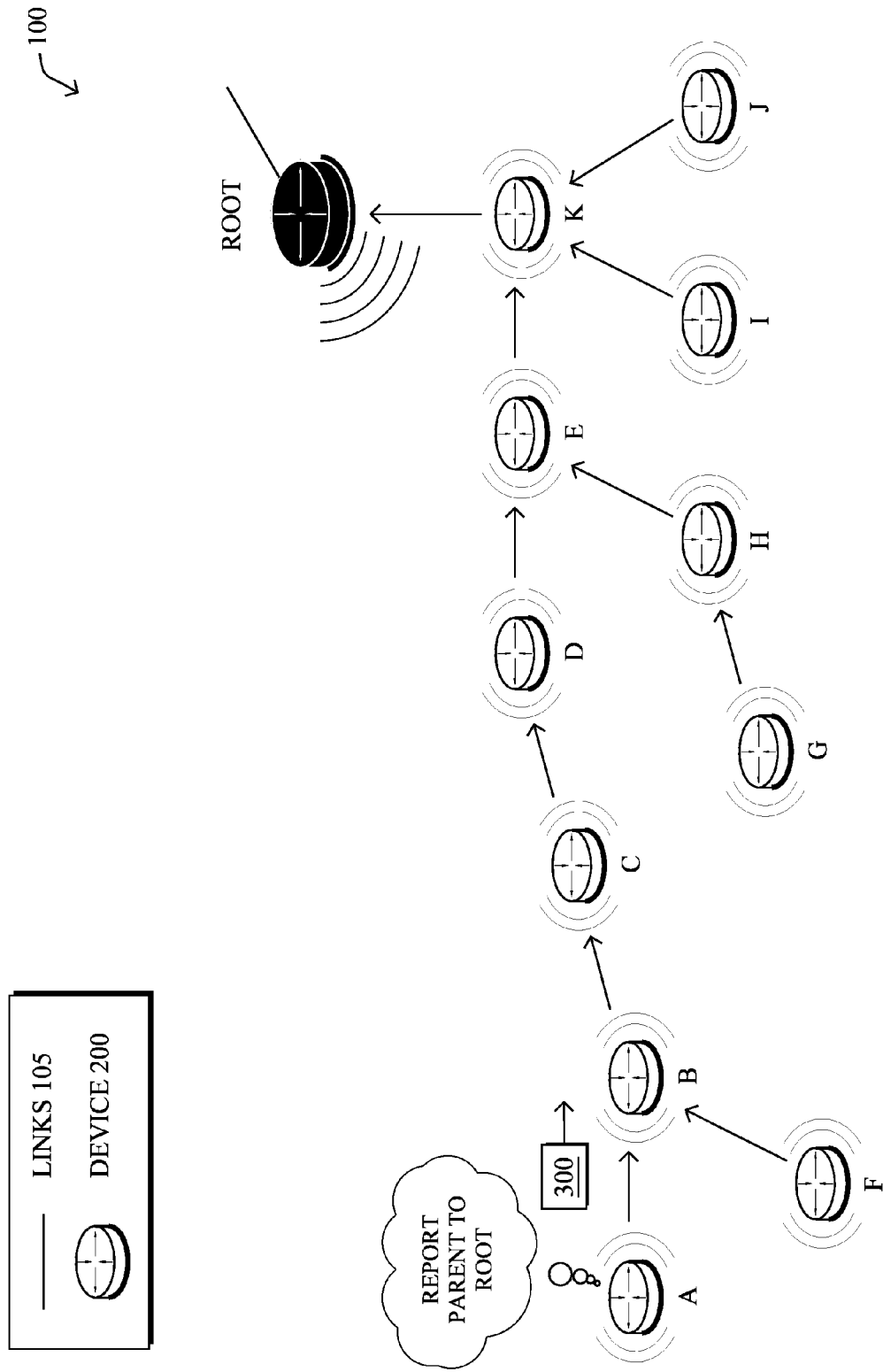
FIGS. 5A-5B illustrate an example of a root node in a network identifying a DAG.
Figure 5B:
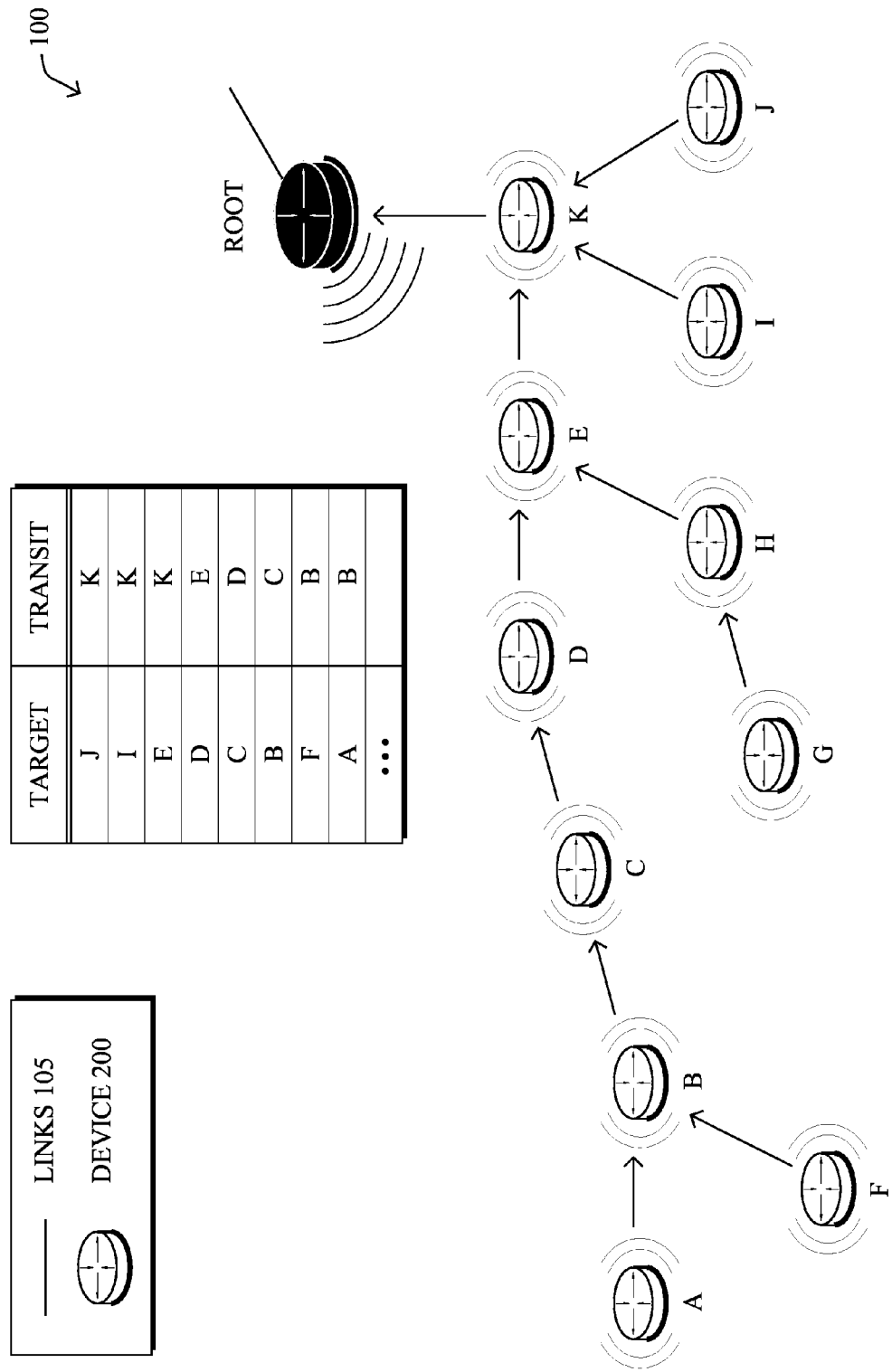

Referring now to FIGS. 5A-5B, an example is shown of a Root node in a network identifying a DAG, according to various embodiments. As shown, assume that the devices/nodes 200 in network 100 and labeled "A" through "K" in the illustrative example are connected to the Root node. Also, assume that these nodes use a distance vector routing protocol (e.g., RPL, etc.), as described above. In such a case, as shown in FIG. 5A, each node may have an address that will need to be advertised (e.g., via a message 300), causing higher volumes of control traffic and state information in network 100. As defined in RFC 6550, RPL generally supports two modes of operation: storing mode and non-storing mode. In storing mode, state information regarding parent-child relationships is stored by the intermediary nodes in the DAG. In non-storing mode, however, state information regarding the nodes is stored instead by the Root node. For example, as shown in FIG. 5B, the Root node may maintain a mapping 502 that indicates the parent-child relationships of the nodes within the DAG. In this case, the Root node will need to build a source routing header (e.g., using a recursive lookup), which may be detrimental to energy and frame size. However, source routing is not typically workable using an 802.15.4 PHY layer in the 2.4 GHz band, which has an MTU of 127 bytes, a large chunk of which is consumed by security.

To send a multicast message to a group of nodes in a network, a multicast tree (S, G) may be established whereby packets are forwarded to the group of destination nodes G if they originate from the source node/device S (e.g., along the entire DAG of the network or a corresponding portion of the DAG, depending on the destinations). Such a tree may be represented by the address of the source device (e.g., 'S') and a group address ('G') that identifies the destination or destinations. For example, assume that the Root device shown in FIG. 5B is to send a multicast message to nodes A, F, and J. In such a case, the multicast tree may be represented by the address of the Root and a multicast address that identifies nodes A, F, and J.

Ensuring that the multicast message reaches all of its destinations is particularly challenging in the context of LLNs. Notably, transmission failures are much more likely in an LLN, which may be subject to the effects of network congestion, cosmic rays, wireless interference, weather conditions, or the like. In such cases, the multicast tree will fail, leading to only a subset of the set of destinations receiving a given multicast packet from the source. Thus, ensuring that a multicast message reaches all of its destinations within an LLN may be challenging, particularly in an LLN environment where, even with the use of hop-by-hop Layer-2 retries (ARQs), the loss rat stays high.

In addition to the often unreliable nature of the links in LLNs, the limited resources of the LLN devices themselves also present certain challenges when attempting to ensure reliable delivery of a multicast message. Typically, for example, reliable multicasting may be implemented by having intermediate nodes along the multicast tree store a copy of the multicast packet and attempt to resend the packet, if the next hop does not acknowledge receipt of the original packet. However, as noted above, many LLN devices may have limited resources, including memory and processing power, which may be quickly consumed by maintaining multicast state at these routers.

Reliable Multicast in LLNs

According to various aspects, the techniques herein provide an efficient way to implement reliable multicasting in an LLN or other constrained network, with minimal network overhead. In some aspects, the multicast mechanism may use bit indexing techniques, thereby reducing the network resources consumed by the multicast mechanism. Notably, bit indexing may be used in an LLN to build very small forwarding tables in the various nodes/routers to be used when forwarding multicast traffic. In a further aspect, the techniques herein may allow intermediate routers/nodes to not store any retransmission state (e.g., multicast packets that need to be resent). Instead, an intermediate node may only store a temporary acknowledgement (ACK) bitmap, which may be pushed to the parent of the router, in case additional memory space is needed.

Specifically, according to one or more embodiments of the disclosure as described in detail below, a device in a network sends a first multicast message to a plurality of destinations in the network. The first multicast message includes a first bitmap that identifies the destinations. The device receives one or more acknowledgements from a subset of the destinations. The device determines a retransmission bitmap that identifies those of the plurality of destinations that did not acknowledge the first multicast message, based on the received one or more acknowledgements. The device sends a retransmission multicast message to those of the plurality of destinations that did not acknowledge the first multicast message. The retransmission multicast message includes the retransmission bitmap.

Illustratively, the techniques described herein may be performed by hardware, software, and/or firmware, such as in accordance with the reliable multicast process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Figure 6A:
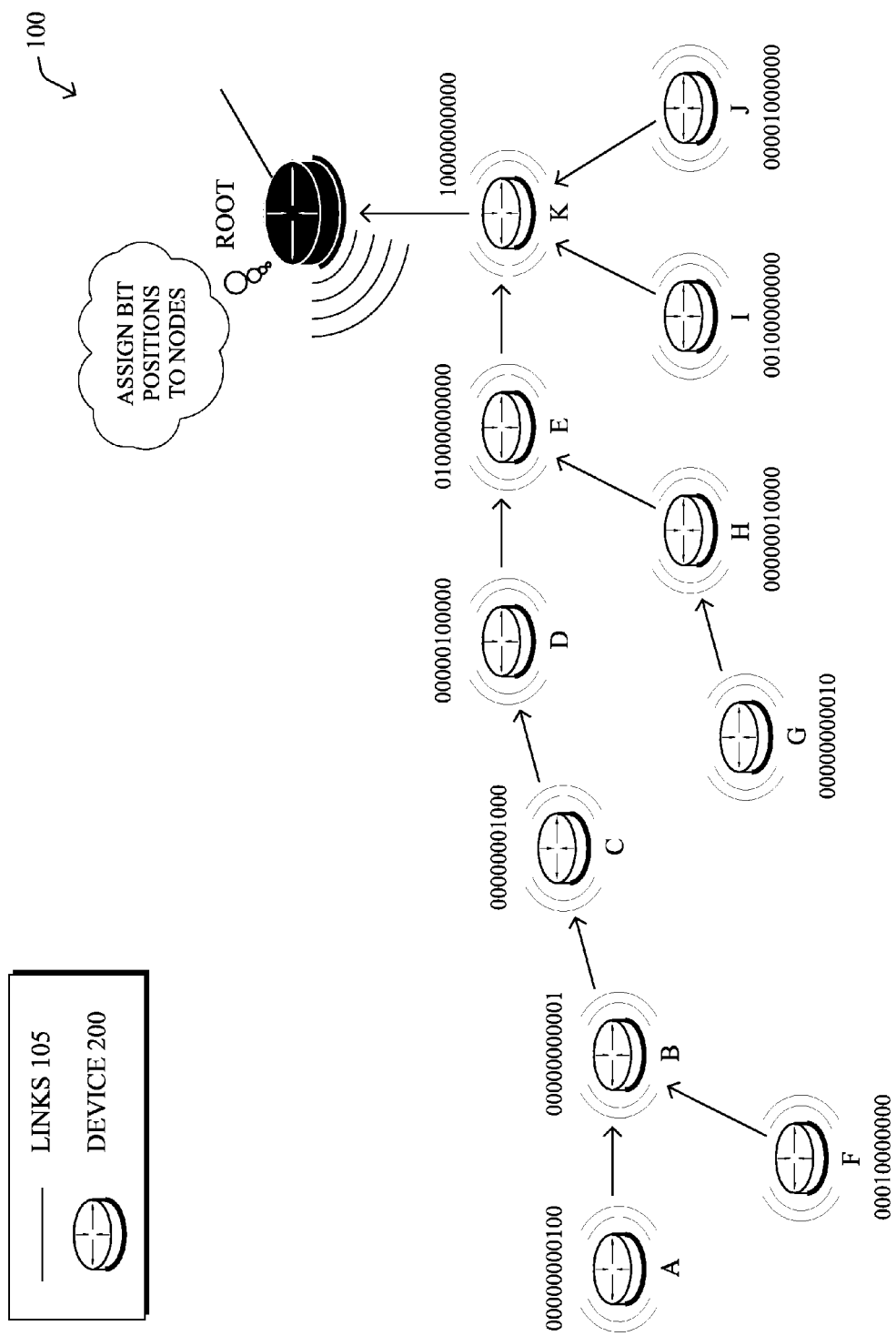
FIGS. 6A-6G illustrate examples of reliable multicasting being performed in a network using bit indexed destinations.

Operationally, an LLN may use a bit indexed mechanism such as bit index explicit replication (BIER), to forward multicast data packets within the network. Information regarding BIER may be found in the proposed IETF Internet-Drafts entitled "Multicast using Bit Index Explicit Replication," by Wijnands et al. (Feb. 2, 2015) and "Encapsulation for Bit Index Explicit Replication in MPLS Networks," by Wijnands et al. (Dec. 4, 2014). For example, as shown in FIG. 6A, the Root device or another supervisory device in network 100 (e.g., server 150, etc.) may assign each of nodes A-K to a unique bit in a bitmap that represents the devices in the local network. As shown, eleven bits may be used to represent the eleven nodes A-K in network 100, each node having its own associated bitmap/value. For example, the bitmap 00000000001 may uniquely identify node B in network 100 and be included in a message send from the Root device to node B, to indicate that the destination of the message is node B.

In many LLN implementations, such as in advanced metering infrastructure (AMI) and advanced meter reading (AMR) implementations, individual mesh networks are usually maintained in relatively small groups and federated by a backbone. For example, a single mesh network of 96 nodes is typically considered to be quite large. In such a mesh, a bitmap of three, 32-bit DWORDs may be sufficient to include an individual bit per node. Another recent aspect is that processors used in LLN devices are evolving towards 32-bit operations. With 96 bits per bitmap and a 32-bit processor, bitmap-based routing would require only three AND operations per child. As would be appreciated, the amount of memory required per device to use the techniques herein is only one bitmap per child. For example, with 96 bits per bitmap, a device needs only store 12 bytes per direct child, which means that the techniques herein may be used on devices that would otherwise normally use RPL in non-storing mode (e.g., due to their limited resources and the amount of state information that would otherwise need to be stored using storing mode).

Figure 6B:
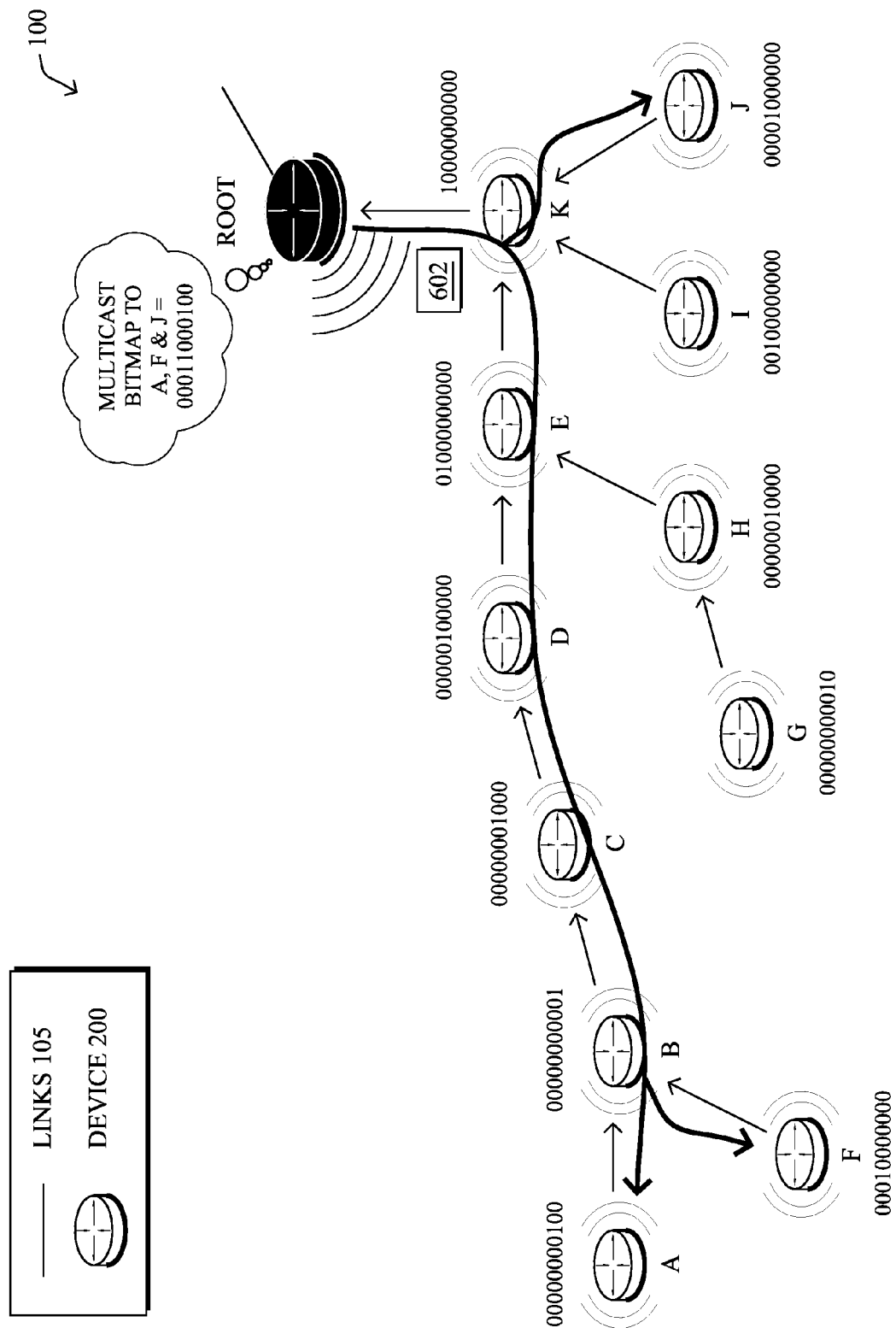

A source device in a multicast tree may send a multicast packet that uniquely identifies the destinations of the multicast packet as a bitmap using the techniques herein. For example, as shown in FIG. 6B, assume that the Root device is a source node in a multicast tree that includes destination nodes A, F, and J. In such a case, the Root device may send a multicast message 602 (e.g., a multicast packet) that includes any or all of the following: a flow identifier, a multicast address (e.g., a bitmap that indicates the addresses of the destinations), and a packet sequence number. For example, the Root device may include such information in a header of multicast message 602. In some cases, each destination node may be identified as a unique bit in a multicast bitmap, which may be sized to cover the largest possible multicast group.

According to various embodiments, the multicast source (e.g., the Root device) may generate the destination bitmap for multicast message 602 by performing logical OR operations on the corresponding bitmaps of the destination nodes. For example, assume that the individual bitmaps for destination devices A, F, and J are 00000000100, 00010000000, and 00001000000, respectively. In such a case, the multicast bitmap that identifies the destinations may be 00011000100 and included in multicast message 602.

Figure 6C:
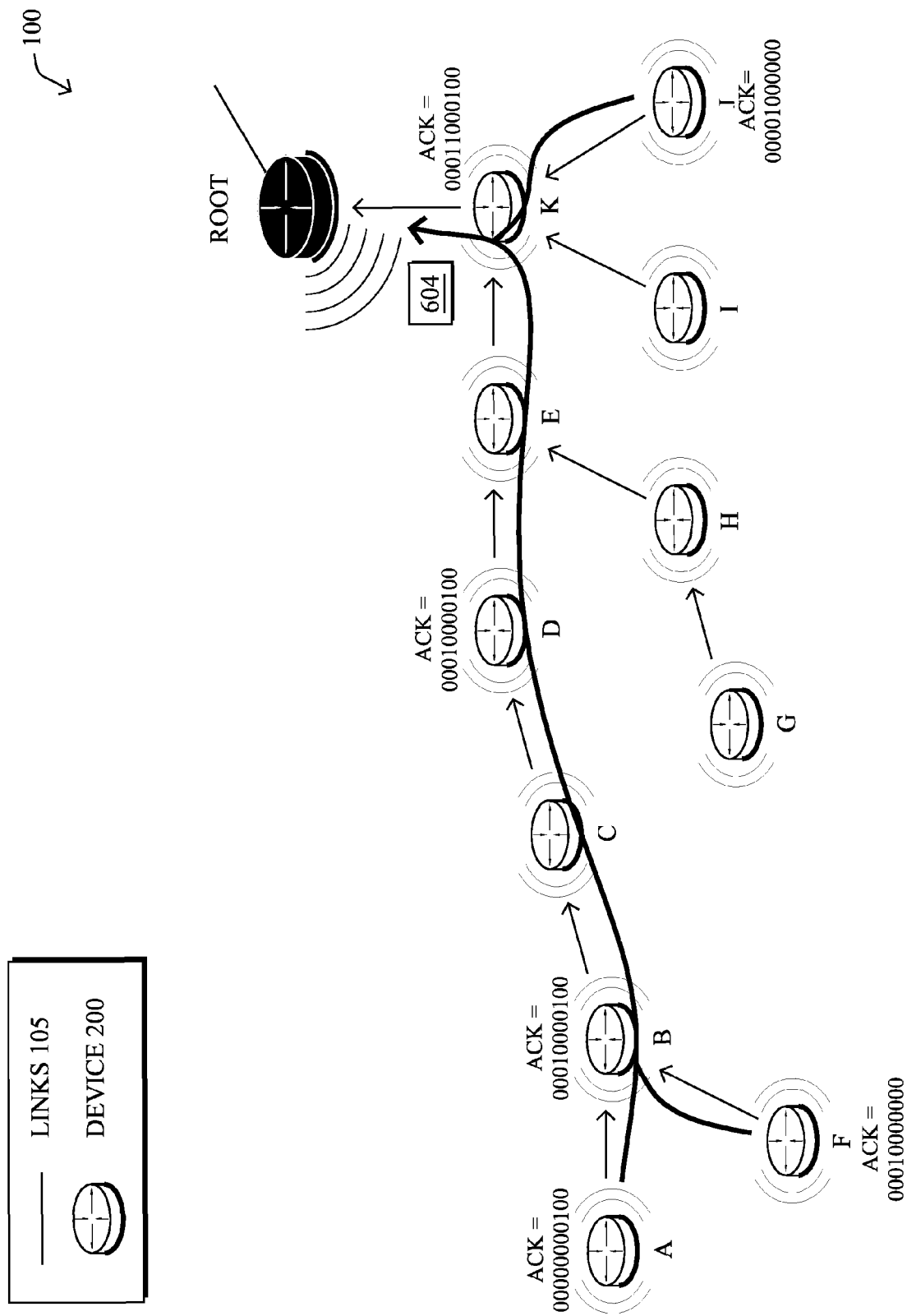

As shown in FIG. 6C, listeners in the multicast tree (e.g., the multicast destinations) may acknowledge receipt of a multicast packet/message, such as multicast message 602. For example, any destination receiving multicast message 602 may send an acknowledgement (ACK) message 604 to its parent (e.g., its RPL parent). An acknowledgement message 604 may include any or all of the following: the packet identifier of multicast message/packet 602, the sequence number of multicast message/packet 602, and an acknowledgement bitmap that uniquely identifies the destination that successfully received multicast message 602. For example, acknowledgement message 604 sent by node A may include the bitmap 00000000100, which uniquely identifies node A.

In various embodiments, intermediary nodes between the multicast source and the multicast destinations may be operable to aggregate acknowledgement messages from the destinations. For example, as shown, node B may be the DAG parent of both destination nodes A and F. In such a case, node B may aggregate the acknowledgement messages 604 returned to node B by nodes A and F, prior to sending its own aggregated acknowledgement message 604 towards the multicast source. In one embodiment, after a parent node forwards the multicast message to its children, the parent node may begin a timer and wait until expiration of the timer before sending its own acknowledgement message 604. Any acknowledgement messages 604 that are received by the parent from its children prior to expiration of the timer may then be included in the aggregated acknowledgement message sent by the parent. In a further embodiment, the intermediary node may send the acknowledgement message to its parent at any time, if additional memory is needed at the intermediary node.

In one example of aggregating acknowledgement messages, assume that nodes A and F each acknowledged receipt of multicast message 602 to node B via acknowledgement messages 604 that included acknowledgement bitmaps 00000000100 and 00010000000, respectively. In turn, node B may aggregate the acknowledgements from nodes A and F into a message 604 that includes an aggregated bitmap 00010000100 formed by performing a local OR on the individual acknowledgement bitmaps of nodes A and F. If node B was also a listener/destination of multicast message 602, it may also aggregate its own individual bitmap into the aggregated bitmap, to indicate that node B also received the multicast message successfully. This process may be repeated by each node up the multicast tree. For example, node K may aggregate the acknowledgement messages from node J and node E, thereby forming an acknowledgement bitmap 00011000100 that node K may include in its own acknowledgement message 604 sent to the Root device. If a node receives an additional acknowledgement message 604 after expiration of its timer, the node may send the additional message individually or aggregate any late-arriving acknowledgements based on an even shorter timer than the initial timer, in various embodiments. In general, the timer of a parent may have a longer duration that that of its children, to cover any variations in acknowledgement times due to the varying depths of the multicast tree.

If the multicast message/packet reaches all of its destinations and the destinations acknowledge receipt of the message, the source node may determine that the multicast message was sent reliably. For example, if the source device receives an acknowledgement that includes an aggregated bitmap that matches the original bitmap included in the multicast message, it may determine that the message successfully reached all of its destinations. Similarly, if the source has multiple children or if it receives multiple acknowledgement messages, it may aggregate any received acknowledgement bitmaps and compare the result to the original multicast bitmap, to determine whether the multicast message reached all destinations (e.g., by performing a subtraction operation on the two bitmaps and analyzing the result).

Figure 6D:
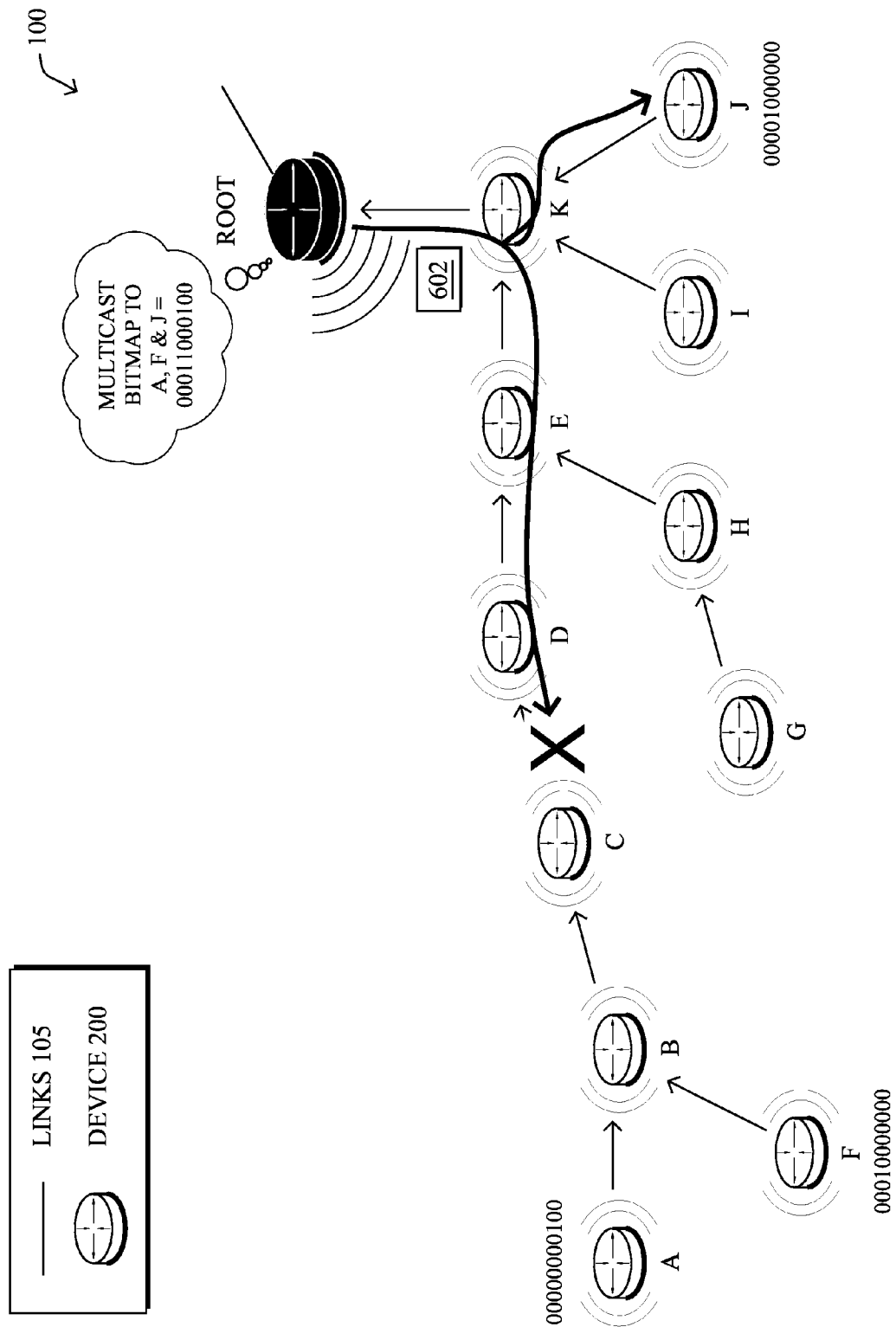
Figure 6E:
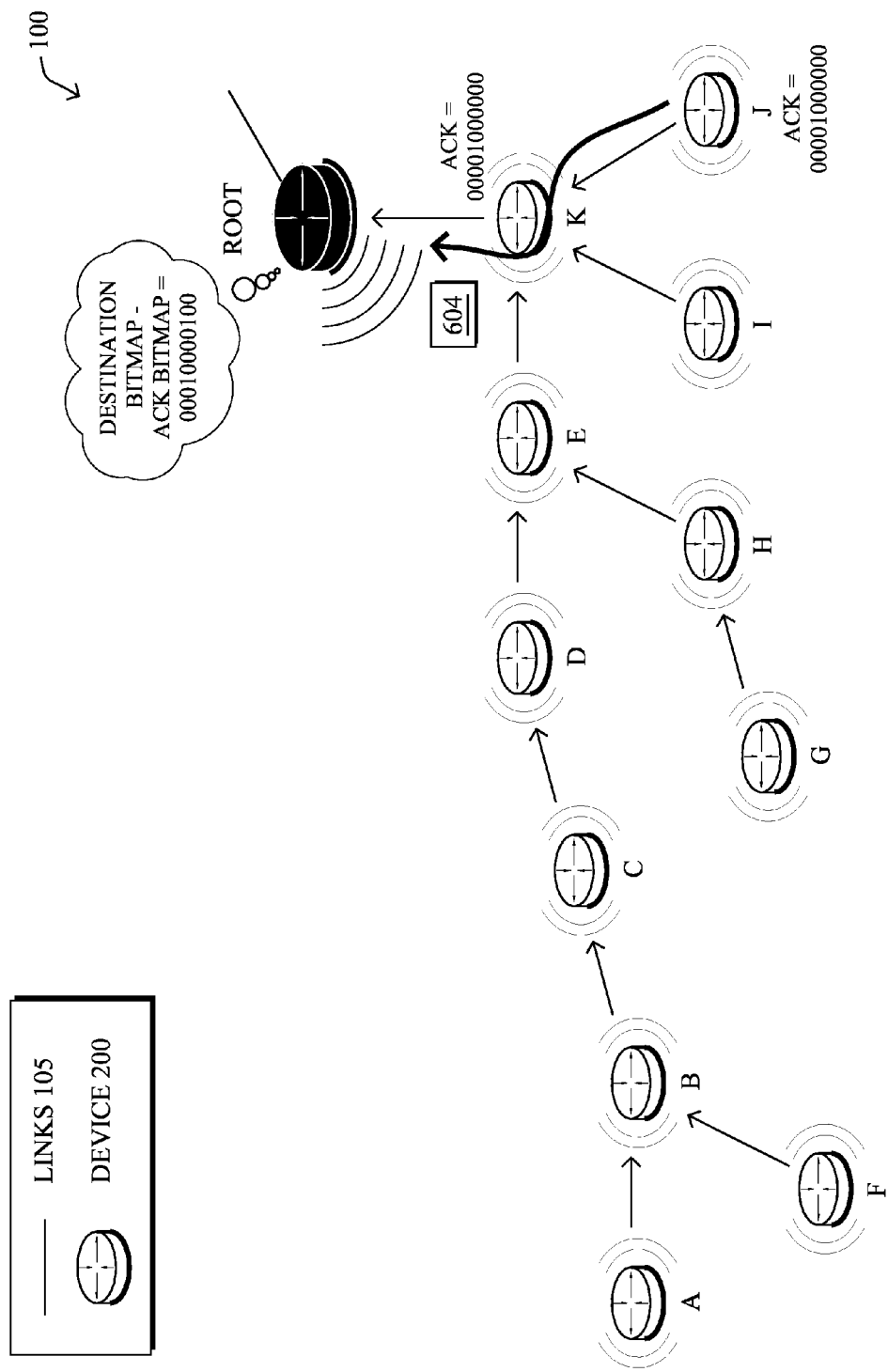

Referring now to FIG. 6D-6E, consider the situation in which multicast message 602 cannot be sent from node D to node C (e.g., due to interference, etc.). Thus, multicast message 602 may not reach its destination nodes A and F. However, since destination node J is located along a different branch of the multicast tree, node J may still receive multicast message 602, as originally sent. In turn, as shown in FIG. 6E, only destination node J may send an acknowledgement message 604 back to the multicast source. In response, the Root device/multicast source may compare the returned bitmap(s) in the acknowledgement(s) to that of the bitmap included in the original multicast message, to determine which destinations, if any, did not acknowledge receipt of the multicast message. In this way, the Root device may determine that destination nodes A and F did not acknowledge receipt of multicast message 602.

Figure 6F:
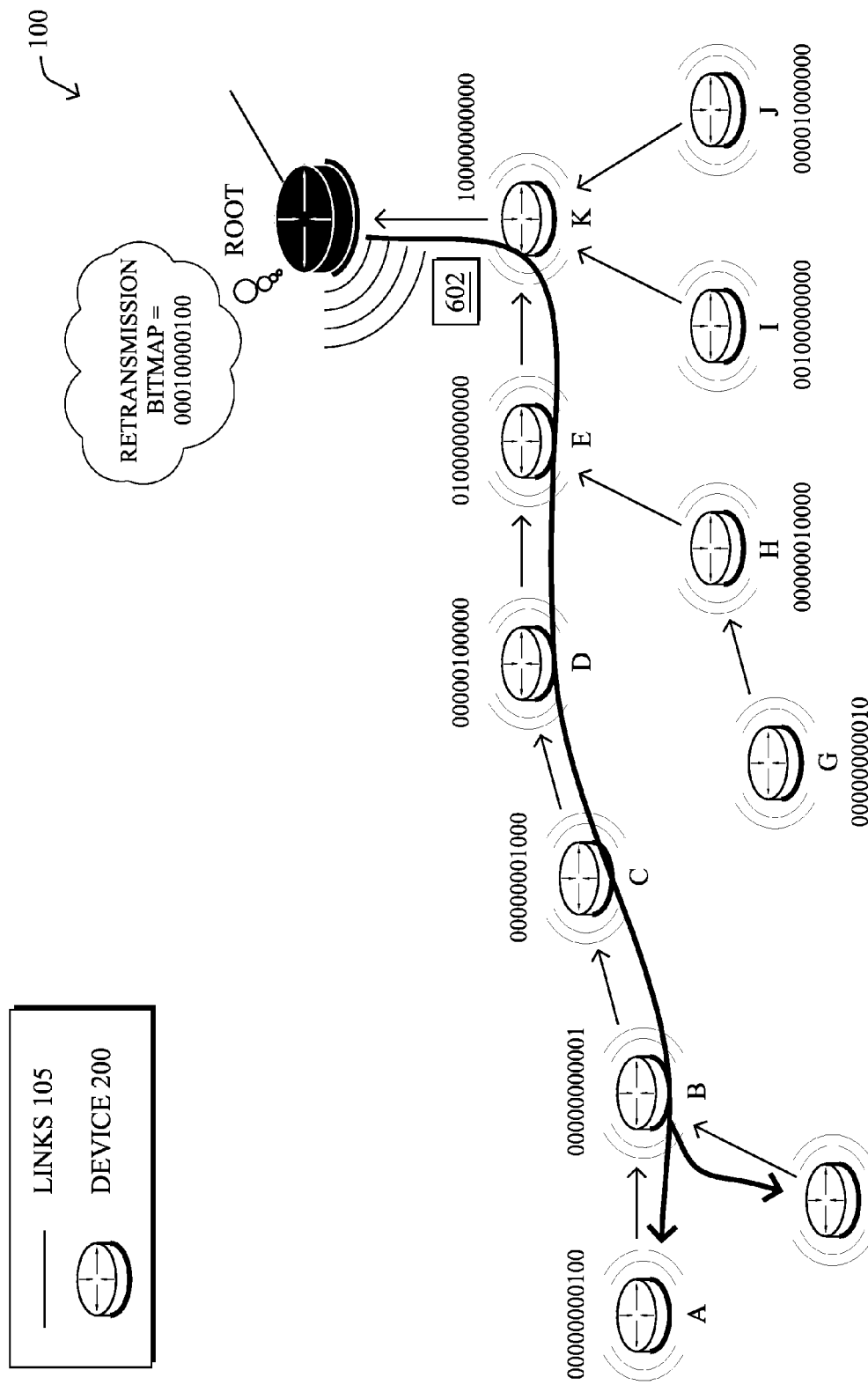

According to various embodiments, the multicast source may retransmit the multicast message/packet to the destinations that did not acknowledge receipt of the original multicast message/packet. For example, as shown in FIG. 6F, the Root node may determine a retransmission bitmap by subtracting the acknowledgement bitmap(s) from the original multicast bitmap (e.g., 00011000100−00001000000=00010000100), thus indicating that nodes A and F did not acknowledge receipt of the original multicast message 602. In one embodiment, the Root node may perform this subtraction by first performing OR operations on the received acknowledgment bitmap(s), if multiple acknowledgement bitmaps are received, to generate a finalized acknowledgement bitmap. If only one acknowledgement bitmap is received, either from a single multicast destination or aggregated for multiple destinations, the Root may treat such a bitmap as the finalized acknowledgement bitmap. Once the Root node determines the finalized acknowledgement bitmap, the Root node may then reverse the bits of the finalized acknowledgement bitmap and perform an AND operation between this bitmap and the bitmap included in the original multicast message. For example, consider the acknowledgement received from node J that includes acknowledgement bitmap 00001000000. In such a case, the Root may deem this to be a finalized acknowledgement bitmap, since no other acknowledgements were received, and reverse the bits to form the bitmap 11110111111. Then, to determine the difference between the acknowledgement(s) and the originally sent bitmap, the Root may perform a logical AND operation on the reversed bitmap 11110111111 and the original bitmap 00011000100, which results in the retransmission bitmap 00010000100.

After determining the retransmission bitmap, the multicast source may then retransmit the multicast message 602 by replacing the original multicast bitmap with the retransmission bitmap in the message. In doing so, as shown in FIG. 6F, the retransmitted multicast message 602 may only be forwarded only along those branches of the multicast tree that are associated with the destinations that did not acknowledge receipt of the original message/packet.

Figure 6G:
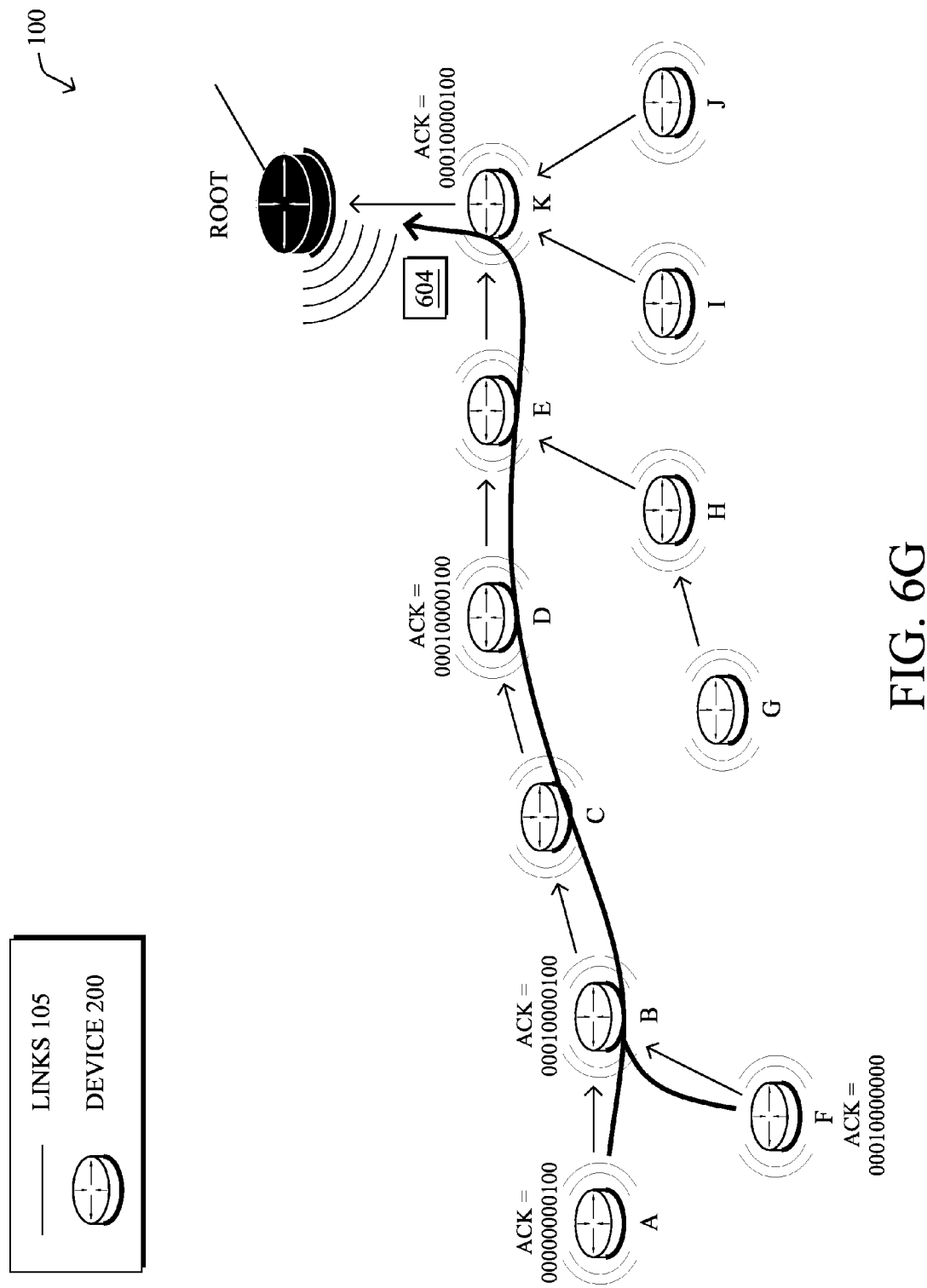

As shown in FIG. 6G, any of the destinations that receive the retransmitted multicast message 602 may send a corresponding acknowledgement message 604 back towards the multicast source. For example, nodes A and F may send acknowledgement messages 604, in response to receiving the retransmitted multicast message 602 sent in the example of FIG. 6F. As described previously, any of the acknowledgement messages 604 sent in response to the retransmitted multicast message 602 may be aggregated along the way by the intermediate nodes along the multicast tree (e.g., by node B). In turn, the multicast source may use the acknowledgements to determine whether any of the destinations still have not acknowledged receipt of the multicast message. In various embodiments, this process may be repeated any number of times until each of the original destinations has acknowledged receipt of the message or an end condition occurs (e.g., n-number of retransmission attempts have been made, a timeout has been reached, etc.). Also, as would be appreciated, the above techniques may be used to implement a reliable unicast mechanism by sending a message to a single destination, in further embodiments.

Figure 7:
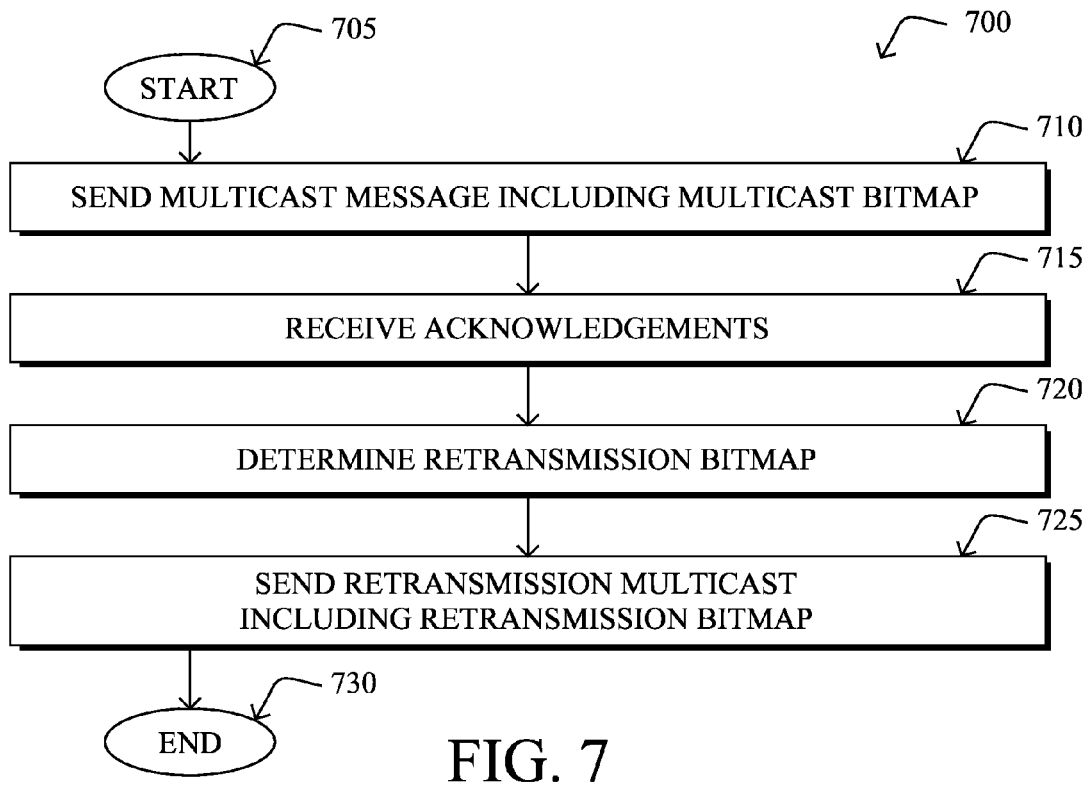
FIG. 7 illustrates an example simplified procedure for sending reliable multicast messages.

FIG. 7 illustrates an example simplified procedure for sending reliable multicast messages, according to various embodiments. In various embodiments, procedure 700 may be performed by a network device (e.g., device 200) acting as a multicast source device, such as a Root node in a network. Procedure 700 begins at step 705 and continues on to step 710 where, as described in greater detail above, the device sends a multicast message to a plurality of destination nodes in the network. In various embodiments, the multicast message may include a bitmap that identifies the destinations in the network. Such a bitmap may, for example, represent each destination as a unique bit set within a set of bits. In some embodiments, the device may assign each node in the network to a particular location in the bitmap and set the corresponding bits of the destinations in the bitmap included in the multicast message (e.g., as a '1,' if non-destinations are set as '0,' or vice-versa). Any intermediate nodes along the multicast tree may then use the bitmap included in the multicast message to make forwarding decisions (e.g., based on their forwarding tables).

At step 715, the device may receive one or more acknowledgements from a subset of the destinations, as described in greater detail above. In various embodiments, such an acknowledgement message may include a bitmap that has the bit associated with a destination that acknowledged receipt of the multicast message set. In some embodiments, an acknowledgement bitmap may be an aggregated bitmap that aggregates acknowledgement bitmaps from two or more destinations. For example, an intermediate node along the multicast tree may receive acknowledgements from two or more nodes in the multicast tree and aggregate their acknowledgement bitmaps into an aggregated bitmap (e.g., by performing a local OR on the acknowledgement bitmaps). In some cases, the intermediate node may aggregate bitmaps from any acknowledgement messages received within a threshold amount of time, before sending the aggregated bitmap in an acknowledgement message to the multicast source.

At step 720, as detailed above, the device may determine a retransmission bitmap based on the received one or more acknowledgements. In particular, the device may subtract any of the bitmaps received in acknowledgement messages from the bitmap included in the original multicast message, to determine the retransmission bitmap. In doing so, only the bits in the retransmission bitmap associated with the destination(s) that did not acknowledge receipt of the multicast message may be set in the retransmission bitmap.

At step 725, the device may send a retransmission multicast message to the one or more destinations that did not acknowledge receipt of the original multicast message, as described in greater detail above. Such a retransmission may, in various embodiments, include the retransmission bitmap determined by the device in step 720. Since the bits for the destinations that acknowledged receipt of the original message are not set in the retransmission bitmap, the retransmission multicast message may, in some cases, be forwarded only down a portion of the multicast tree towards the destinations that did not acknowledge receipt of the original message. In various cases, the retransmission multicast message may also include any message identifiers that were included in the original multicast message such as a packet sequence number or flow identifier. Procedure 700 then ends at step 730.

Figure 8:
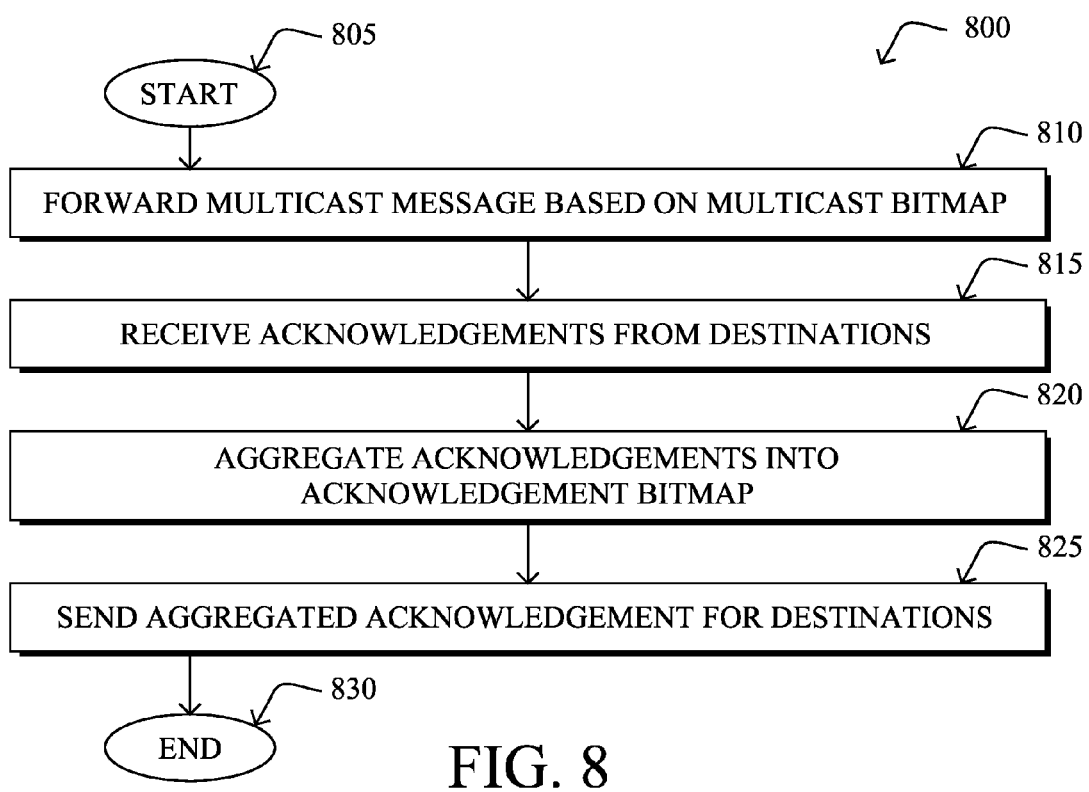
FIG. 8 illustrates an example simplified procedure for sending an aggregated acknowledgement for a multicast message.

FIG. 8 illustrates an example simplified procedure for sending an aggregated acknowledgement for a multicast message. The procedure 800 may be performed by any node/device (e.g., device 200) in a network that acts as an intermediate node along a multicast tree. Procedure 800 begins at step 805 and continues on to step 810 where, as described in greater detail above, the node forwards a multicast message/packet to a plurality of destinations based on a bitmap included in the multicast message that identifies the set of destinations of the multicast message. For example, such a bitmap may include set bits that are uniquely associated with individual devices in the network. Using the forwarding table of the node and the bitmap included in the multicast message, the node may identify the destinations to which it must forward the message and forward the message accordingly.

At step 815, as detailed above, the node receives acknowledgements from at least two of the destinations. In various embodiments, a particular acknowledgement received by the node may include an acknowledgement bitmap that identifies one of the plurality of destinations that acknowledged receipt of the multicast message forwarded in step 810. Such a bitmap may be the bitmap originally sent by the destination that acknowledged receipt of the multicast message or may, in some embodiments, be an aggregated bitmap that identifies multiple destinations that have acknowledged receipt).

At step 820, the node aggregates the received acknowledgements by aggregating the acknowledgement bitmaps into an aggregated bitmap, as described in greater detail above. Such an aggregated bitmap may identify those of the plurality of destinations that acknowledged receipt of the first multicast message. For example, the node may perform a logical OR operation on the bitmaps included in the received acknowledgements, to determine the aggregated bitmap. In some embodiments, the node may aggregate the acknowledgements for the multicast message, in response to expiration of a timer maintained by the node (e.g., to allow enough time for the destinations to acknowledge receipt of the multicast message back to the node). In one embodiment, if the node itself was a destination of the multicast message, it may set its own corresponding bit in the aggregated bitmap.

At step 825, the node provides an aggregated acknowledgement message to the source of the multicast message, as detailed above. Such a message may include the aggregated bitmap of step 820, to identify to the source of the multicast message which nodes along the branch of the multicast tree to which the node belongs acknowledged receipt of the multicast message. In turn, the source may retransmit the multicast message with a retransmission bitmap that identifies the destinations of the original multicast message that did not acknowledge receipt of the message. In such a case, the node may forward the retransmitted multicast message according to the retransmission bitmap. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for a reliable multicast mechanism to be implemented within networks having limited resources, such as LLNs. In particular, the retransmission mechanism provides for intermediary nodes that do not store retransmission state (e.g., packets to be resent), thereby freeing up resources. Instead, in some cases, the intermediary node may only store a temporary acknowledgement bitmap, which may be pushed to the parent of the node at any time.

While there have been shown and described illustrative embodiments, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    assigning, by a device in a network, each node in the network to a specific bit of a bitmap that represents devices in the network;
    sending, by the device, a first multicast message to a plurality of destinations in the network, wherein the first multicast message includes a first bitmap that identifies the destinations, the first bitmap identifying a particular destination in the plurality of destinations to which the first multicast message is sent by the corresponding specific bit in the first bitmap that is set by the device;
    receiving, at the device, one or more acknowledgements including acknowledgement bitmaps from a subset of the destinations, each acknowledgement bitmap identifying a particular destination in the plurality of destinations that acknowledged receipt of the first multicast message, and at least one of the acknowledgments including an aggregated acknowledgement bitmap determined by a node in the network by aggregation of individual acknowledgement bitmaps received from the destinations and uniquely identifying the destinations;
    determining, by the device, a retransmission bitmap that identifies those of the plurality of destinations that did not acknowledge the first multicast message, based on the received one or more acknowledgements by:
        aggregating the acknowledgement bitmaps included in the acknowledgements received by the device into a second bitmap; and
        determining, by the device, the retransmission bitmap as a difference between the first bitmap and the second bitmap; and
    sending, by the device, a retransmission multicast message to those of the plurality of destinations that did not acknowledge the first multicast message, wherein the retransmission multicast message includes the retransmission bitmap.

2. The method as in claim 1, wherein
the aggregated acknowledgement bitmap identifies two or more of the destinations that acknowledged the first multicast message.

3. The method as in claim 2, wherein the aggregated acknowledgement bitmap is generated by the node in the network after expiration of a timer maintained by the node.

4. The method as in claim 1, wherein the retransmission bitmap identifies a particular destination in the plurality of destinations by a specific bit in the bitmap that is set by the device.

5. A method comprising:
    forwarding, by a node in a network, a first multicast message sent by a device in the network to a plurality of destinations based on a first bitmap included in the first multicast message, wherein each node in the network is assigned to a specific bit of a bitmap that represents devices in the network by the device, wherein the first bitmap identifies the plurality of destinations, the first bitmap identifying a particular destination in the plurality of destinations to which the first multicast message is sent by the corresponding specific bit in the first bitmap that is set by the device;
    receiving, at the node, acknowledgements from two or more of the plurality of destinations, wherein a particular received acknowledgement includes an acknowledgement bitmap that identifies a particular one of the plurality of destinations that acknowledged receipt of the multicast message;
    aggregating, by the node, the received acknowledgements by aggregating the acknowledgement bitmaps into an aggregated acknowledgement bitmap, wherein the node sets a bit in the aggregated acknowledgement bitmap that is uniquely associated with the node and wherein the aggregated acknowledgement bitmap identifies those of the two or more plurality of destinations that acknowledged receipt of the first multicast message;
    providing, by the node, an aggregated acknowledgement that includes the aggregated acknowledgement bitmap to the device that sent the multicast message;
    receiving, at the node, a retransmission multicast message that includes a retransmission bitmap that identifies those of the plurality of destinations that did not acknowledge the first multicast message; and
    forwarding, by the node, the retransmission multicast message to those of the plurality of destinations that did not acknowledge the first multicast message.

6. The method as in claim 5, wherein the received acknowledgements are aggregated by the node in response to expiration of a timer maintained by the node.

7. The method as in claim 5, wherein the node is a destination of the multicast message.

8. An apparatus, comprising:
    one or more network interfaces to communicate with a computer network;

a processor coupled to the one or more network interfaces and configured to execute a process; and a memory configured to store the process executable by the processor, the process when executed operable to:

assign, by a device in a network, each node in the network to a specific bit of a bitmap that represents devices in the network;

send a first multicast message to a plurality of destinations in the network, wherein the first multicast message includes a first bitmap that identifies the destinations, the first bitmap identifying a particular destination in the plurality of destinations to which the first multicast message is sent by the corresponding specific bit in the first bitmap that is set by the apparatus device;

receive one or more acknowledgements including acknowledgement bitmaps from a subset of the destinations, each acknowledgement bitmap identifying a particular destination in the plurality of destinations that acknowledged receipt of the first multicast message, and at least one of the acknowledgments including an aggregated acknowledgement bitmap determined by a node in the network by aggregation of individual acknowledgement bitmaps received from the destinations and uniquely identifying the destinations;

determine a retransmission bitmap that identifies those of the plurality of destinations that did not acknowledge the first multicast message, based on the received one or more acknowledgements by:

aggregating the acknowledgement bitmaps included in the acknowledgements received by the apparatus into a second bitmap; and determining the retransmission bitmap as a difference between the first bitmap and the second bitmap; and send a retransmission multicast message to those of the plurality of destinations that did not acknowledge the first multicast message, wherein the retransmission multicast message includes the retransmission bitmap.

9. The apparatus as in claim 8, wherein the aggregated acknowledgement bitmap identifies two or more of the destinations that acknowledged the first multicast message.

10. The apparatus as in claim 9, wherein the aggregated acknowledgement bitmap is generated by the node in the network after expiration of a timer maintained by the node.

11. The apparatus as in claim 8, wherein the retransmission bitmap identifies a particular destination in the plurality of destinations by a specific bit in the bitmap that is set by the apparatus.

12. An apparatus, comprising:

one or more network interfaces to communicate with a computer network;

a processor coupled to the one or more network interfaces and configured to execute a process; and a memory configured to store the process executable by the processor, the process when executed operable to:

forward a first multicast message sent by a device in the network to a plurality of destinations based on a first bitmap included in the first multicast message, wherein each node in the network is assigned to a specific bit of a bitmap that represents devices in the network by the device, wherein the first bitmap identifies the plurality of destinations, the first bitmap identifying a particular destination in the plurality of destination to which the first multicast message is sent by the corresponding specific bit in the first bitmap that is set by the device;

receive acknowledgements from two or more of the plurality of destinations, wherein a particular received acknowledgement includes an acknowledgement bitmap that identifies a particular one of the plurality of destinations that acknowledged receipt of the multicast message;

aggregate the received acknowledgements by aggregating the acknowledgement bitmaps into an aggregated acknowledgement bitmap, wherein the node sets a bit in the aggregated acknowledgement bitmap that is uniquely associated with the node and wherein the aggregated acknowledgement bitmap identifies those of the two or more plurality of destinations that acknowledged receipt of the first multicast message; and provide an aggregated acknowledgement that includes the aggregated acknowledgement bitmap to the device that sent the multicast message;

receive a retransmission multicast message that includes a retransmission bitmap that identifies those of the plurality of destinations that did not acknowledge the first multicast message; and forward the retransmission multicast message to those of the plurality of destinations that did not acknowledge the first multicast message.

13. The apparatus as in claim 12, wherein the received acknowledgements are aggregated by the apparatus in response to expiration of a timer maintained by the node.

14. The apparatus as in claim 12, wherein the node is a destination of the multicast message.

* * * * *

UNITED STATES PATENT AND TRADEMARK OFFICE
CERTIFICATE OF CORRECTION

PATENT NO. : 9,900,169 B2
APPLICATION NO. : 14/661301
DATED : February 20, 2018
INVENTOR(S) : Pascal Thubert et al.

Page 1 of 1

It is certified that error appears in the above-identified patent and that said Letters Patent is hereby corrected as shown below:

In the Specification

In Column 4, Line 58, please amend as shown:
Rate/Ratio (PDR) can dramatically vary due to various In Column 9, Line 9, please amend as shown:
(ARQs), the loss ratio stays high.

Signed and Sealed this
First Day of December, 2020

Andrei Iancu
*Director of the United States Patent and Trademark Office*